(12) United States Patent
Seletskiy et al.

(10) Patent No.: US 9,574,801 B1
(45) Date of Patent: Feb. 21, 2017

(54) SOLID STATE OPTICAL REFRIGERATION USING STARK MANIFOLD RESONANCES IN CRYSTALS

(75) Inventors: Denis V. Seletskiy, Albuquerque, NM (US); Richard Epstein, Santa Fe, NM (US); Markus P. Hehlen, Los Alamos, NM (US); Mansoor Sheik-Bahae, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 1423 days.

(21) Appl. No.: 12/977,465

(22) Filed: Dec. 23, 2010

Related U.S. Application Data

(60) Provisional application No. 61/284,808, filed on Dec. 24, 2009.

(51) Int. Cl.
*F25B 21/00* (2006.01)
*F25B 23/00* (2006.01)

(52) U.S. Cl.
CPC .............. *F25B 21/00* (2013.01); *F25B 23/00* (2013.01)

(58) Field of Classification Search
CPC ................................ F25B 21/00; F25D 27/00
USPC ..................................................... 62/3.1, 264
See application file for complete search history.

(56) References Cited

U.S. PATENT DOCUMENTS 6,041,610 A * 3/2000 Edwards et al. ............... 62/264
6,378,321 B1 * 4/2002 Epstein et al. ................. 62/264

OTHER PUBLICATIONS

Seletskiy et al, Cooling of Yb:YLF using cavity enhanced resonant absorption, Proc. of SPIE, vol. 6907, 69070B, 2008.*
Sugiyama et al, Spectroscopic properties of Yb doped YLF grown by vertical Bridgman method, Journal of Alloys and Compounds, 408-412 (2006).*
Coluccelli et al, Diode-pumped passively mode-locked Yb:YLF laser, Optics Express, vol. 6, No. 5 (2008).*
Carrig et al, Single-frequency, diode-pumped Yb:YAG and Yb:YLF lasers, Optical Society of America, vol. 34 (2000).*
Kawanaka et al, Dramatically Improved Laser Characteristic of Diode-Pumped Yb-doped Materials at Low Temperature, Vo. 15, No. 9, 2005, pp. 1306-1312.*
Mungan et al, Spectroscipic Determination of the Expected Optical Cooling of Ytterbium-Doped Glass, Mat. Sci. Forum 239-241, 501-504, (1997).*

* cited by examiner

*Primary Examiner* — Elizabeth Martin
(74) *Attorney, Agent, or Firm* — MH2 Technology Law Group LLP

(57) ABSTRACT

A method and device for cooling electronics is disclosed. The device includes a doped crystal configured to resonate at a Stark manifold resonance capable of cooling the crystal to a temperature of from about 110K to about 170K. The crystal host resonates in response to input from an excitation laser tuned to exploit the Stark manifold resonance corresponding to the cooling of the crystal.

9 Claims, 3 Drawing Sheets

SOLID STATE OPTICAL REFRIGERATION USING STARK MANIFOLD RESONANCES IN CRYSTALS

RELATED APPLICATIONS

This application claims priority from U.S. Provisional Patent Application Ser. No. 61/284,808, filed Dec. 24, 2009, which is hereby incorporated by reference in its entirety.

GOVERNMENT RIGHTS

The present invention was made with Government support under Contract Number FA 9550-04-1-0356 awarded by the Air Force Office of Scientific Research and Grant No. DE-AC52-06NA25396 DOE/NNSA awarded by Los Alamos National Laboratory. The Government has certain rights in the invention.

FIELD OF THE INVENTION

This invention relates generally to cooling of electronic devices, and more particularly, optical refrigeration and, more specifically, to the use of Stark manifold resonances in doped crystals to increase cooling efficiency.

BACKGROUND OF THE INVENTION

Optical refrigeration can include laser excitation of rare-earth doped glass and crystal host material systems. In some systems, optical refrigeration can include use of ytterbium doped fluorozirconate glass (Yb:ZBLAN).

In an optical refrigeration system, a cooling cycle is based on conversion of low-entropy low-energy input of an optical field (e.g. laser) into an isotropic higher-energy spontaneous emission (fluorescence). The excitation laser is red-shifted from a mean wavelength of the emitted fluorescence ($\lambda_f$). Following absorption, out of equilibrium excitation becomes thermalized within the ground and exited state manifolds of the rare-earth ion. This is accomplished by phonon absorption from lattice vibrations of a material host. Thermal quanta of energy kT are carried away from the host in a form of spontaneously emitted photons, thereby cooling the material.

Heat generating, non-radiative recombination pathways are undesirable, leading to a demand for high quantum efficiency ($\eta_{eqe}$) materials. Rare-earth ions (e.g. Ytterbium) exhibit metastable transitions in the lowest energy levels, satisfying a requirement for high quantum efficiency. An additional requirement is for high host purity. Impurities (e.g. transition-metals) introduce extrinsic heat generating recombination pathways, which are manifested in reduction of absorption efficiency, $\eta_{abs}$, further defined below. Both of these requirements for high quantum efficiency and absorption efficiency are captured in an expression for cooling efficiency, defined as a ratio of cooling power to absorbed power:

$$\eta_c(\lambda, T) = \frac{P_{cool}}{P_{abs}} = \eta_{eqe}\left[\frac{1}{1 + \alpha_b / \alpha_r(\lambda, T)}\right]\frac{\lambda}{\lambda_f(T)} - 1 \quad (1)$$

where $\lambda$ denotes laser wavelength, $\alpha_b$ is the background absorption coefficient, and $\alpha_r(\lambda)$ is the resonant absorption coefficient of Yb ions. The product in brackets is denoted as absorption efficiency $\eta_{abs}$. In practical applications, material sheds a $k_B T$ of thermal energy per excitation, which means that the product $\eta_{eqe}\eta_{abs} > 1 - k_B T/h\nu_F$, where $\nu_F = c/\lambda_F$, and c=speed of light. For example, for room temperature Yb emission, this product must be larger than 96.8%, while at a temperature of 100K, this product must be larger than 99%. Because $\eta_{eqe}$ is governed by intrinsic recombination mechanisms for a given material, $\eta_{abs}$ must be improved in order to obtain low temperature operation of an optical refrigerator.

As material cools, resonant absorption in the anti-Stokes tail falls exponentially, following the Boltzmann law. This is the main reason which halts cooling at low temperatures. In order to achieve cooling to lower temperatures requirement of high absorption efficiency has to be met. In order to increase the absorption efficiency ($\eta_{abs}$) one has to minimize the ratio $\alpha_b/\alpha_r(\lambda)$. A common approach to accomplish that has been to lower background absorption by purifying a material growth process and starting materials. A more recent method has relied on an increase of the resonant absorption (together with low $\alpha_b$) to enhance the absorption efficiency.

These challenges can be been dealt with herein, using Stark manifold resonances to increase cooling efficiency in optical refrigeration devices, as will be described in connection with the exemplary embodiments that follow.

SUMMARY

According to exemplary embodiments, a doped crystal configured to resonate at a Stark manifold resonance is capable of cooling the crystal to a temperature of from about 110K to about 170K.

In addition, according to exemplary embodiments, an optical refrigeration system is disclosed. The optical refrigeration system can include a doped crystal configured to resonate at a Stark manifold resonance capable of cooling the doped crystal to a temperature of about 110K to about 170K; and an excitation laser tuned to excite the doped crystal at a predetermined wavelength corresponding to a selected Stark manifold resonance.

In yet further exemplary embodiments, a method of exploiting Stark manifold resonances in crystals to increase the cooling efficiency of an optical refrigerator is disclosed. The method can include doping a crystal to enable resonance at a Stark manifold resonance capable of cooling the doped crystal to a temperature of about 110K to about 170K; and tuning an excitation laser to excite the doped crystal at a predetermined wavelength corresponding to a selected Stark manifold resonance.

DETAILED DESCRIPTION

As described herein, for a given level of background absorption, exemplary embodiments allow for increases in the cooling efficiency of an optical refrigerator by exploiting sharp Stark manifold resonances of a crystalline material. The preferred embodiments of the present invention include composite materials and methods of making the same. Those of skill in the art will appreciate that the following description is related to preferred and/or example embodiments of the present invention, and that the scope of the present invention is defined exclusively within the appended claims.

Due to long-range order in a crystal, dopant atomic levels are broadened with less inhomogeneous contribution than glasses, leading to a larger resonant as absorption in the cooling tail (i.e. below mean luminescence wavelength of the emission).

Figure 1:
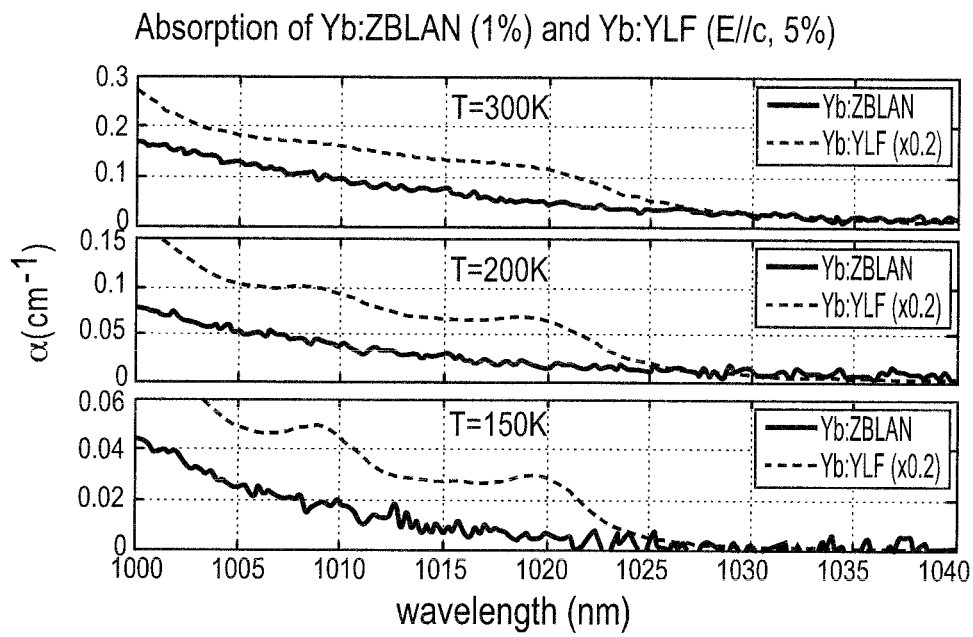
FIG. 1 shows an absorption spectra of Yb:ZBLAN together with Yb:YLF which is scaled down by factor of five. It should be evident that a significant absorption enhancement is present in Yb:YLF at 1020 nm as compared to Yb:ZBLAN.

FIG. 1 provides, for comparison, absorption tails of Yb:ZBLAN and Yb:YLF (ytterbium doped yttrium lithium fluoride crystal) at different temperatures, with the Yb:YLF crystal corresponding to a doped crystal structure of the exemplary embodiments. The figure, normalized for different dopant density, shows absorption of ytterbium (Yb) in each of the glass host and the crystal host. However, when temperature is reduced, inhomogeneously broadened Yb absorption in the glass host diminishes monotonically everywhere spectrally. In contrast, Yb absorption doped into a YLF crystal host shows pronounced peaks. The peak at about 1020 nm is significant, as it corresponds to large detuning from the mean luminescence wavelength of these materials (~1000 nm). This peak corresponds to an E4-E5 Stark manifold transition in the Yb:YLF material. Referring again to Equation (1), cooling efficiency is enhanced at the E4-E5 peak through increase of absorption efficiency (since background absorption is believed to be constant within the wavelength range of interest for given materials). Because of the temperature dependence of mean luminescence wavelength at the resonant absorption spectrum, a Yb doped crystal host can exhibit cooling efficiency based on both temperature and wavelength.

Figure 2:
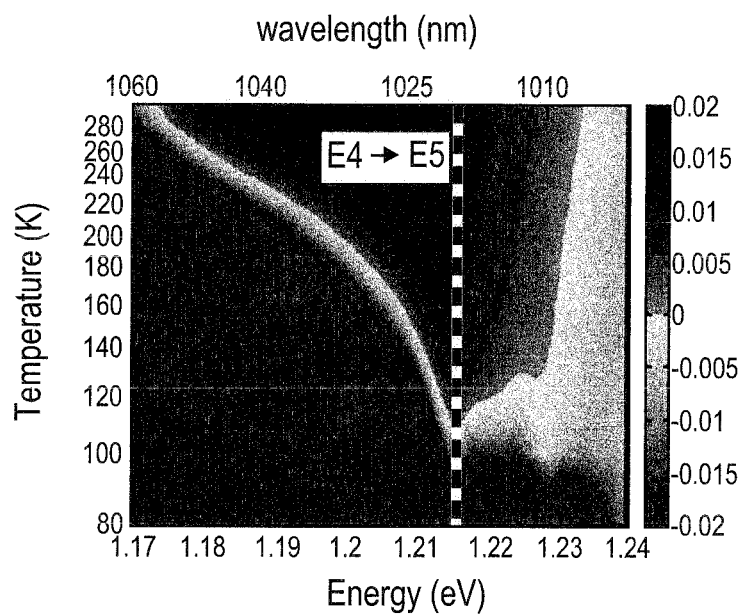
FIG. 2 is a contour plot of cooling efficiency versus wavelength and temperature wherein the enhancement of cooling (blue) region is clearly observed near 1020 nm, corresponding to resonant absorption enhancement at the E4-E5 transition, according to exemplary embodiments herein.

FIG. 2 shows a contour plot of cooling efficiency versus wavelength and temperature for known values of background absorption $4.2 \times 10^{-4}$ cm$^{-1}$ and external quantum efficiency of 0.995. The area indicated at E4-E5 corresponds to cooling of the sample. Enhancement of cooling to lower temperatures is demonstrated at about 1020 nm, corresponding to E4-E5 transition.

In the exemplary embodiments, cooling efficiency is enhanced by exploiting Stark manifold resonance in the cooling tail. However, these embodiments are not limited by YLF crystal; rather the described concepts can be applied to any crystal host, exhibiting such levels. Embodiments can utilize the excitation of the Stark manifold resonances so cryogenic operation, for even modest purity samples, can be achieved. Currently manageable improvements in material purification can allow nitrogen liquefaction point (i.e., 77K) to be reached with an all-solid-state cryocooler, based on, for example, a Yb:YLF host, pumped in the E4-E5 transition.

The described Yb doped YLF crystal can be used in applications for airborne and spaceborne sensors. An optical refrigeration or solid state optical refrigeration device using the disclosed technology offers many advantages over currently used, bulky mechanical coolers because it can be configured in a device which is vibration free, compact, lightweight and agile. Previously, only solid-state coolers based on standard thermoelectric devices were able to reach temperatures as low as 170K, and even so, only with minimal efficiency. With the disclosed embodiments, enhanced cooling efficiency can be obtained by exploiting resonances in the absorption spectrum, growing pure crystals, using thin optical fibers, keeping their sample in thermal isolation inside a vacuum and by trapping laser light in a resonant space.

Figure 3:
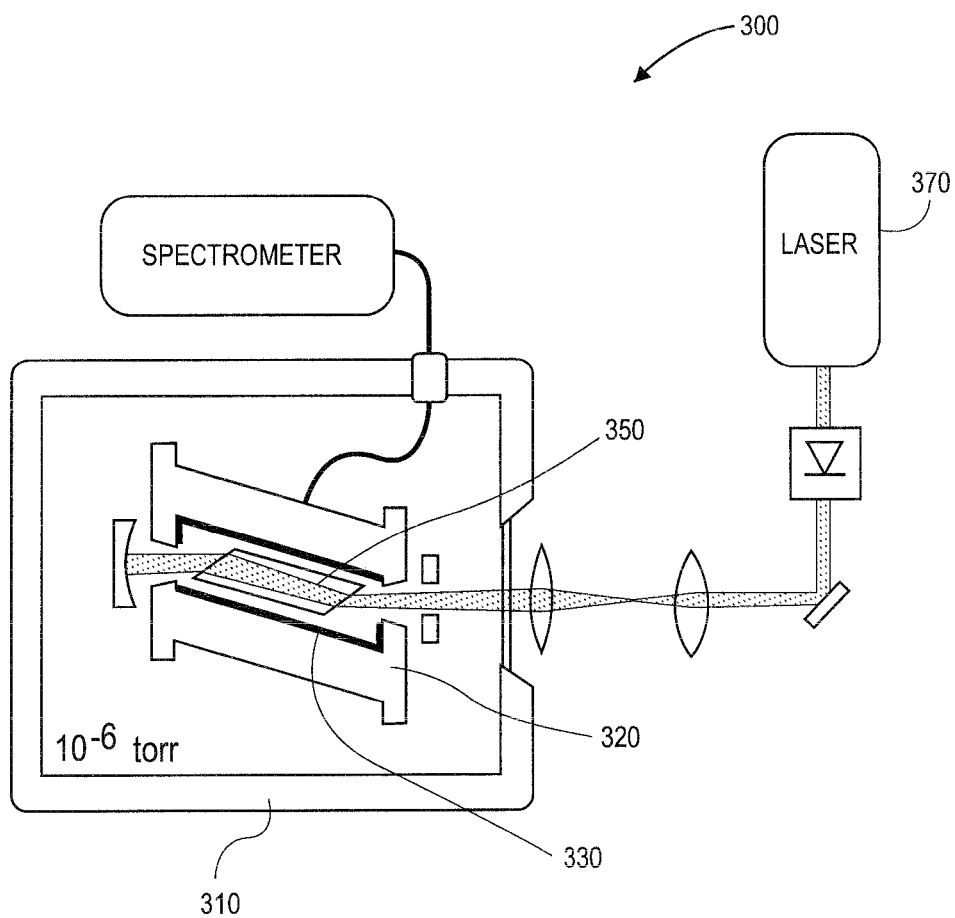
FIG. 3 is a perspective view of a setup for an optical refrigerator device, according to exemplary embodiments herein.

FIG. 3 shows a perspective view of an optical cryocooler device 300, according to exemplary embodiments herein. It should be readily apparent to one of ordinary skill in the art that the illustration of FIG. 3 represents a generalized schematic illustration and that other components can be added or existing components can be removed or modified.

The optical cryocooler device 300 of FIG. 3 is configured to utilize and demonstrate the Stark manifold resonances in doped crystals. It will be appreciated that the configuration is exemplary only, and that doped crystals, configured to resonate at a Stark manifold resonance capable of cooling the crystal to a temperature of from about 110K to about 170K, can be incorporated into known optical refrigeration devices, e.g. cryocoolers, etc.

In FIG. 3, the optical cryocooler 300 can include an outer structure 310 housing a high vacuum chamber 320, the chamber 320 lined with a radiation shield 330. A resonant cavity 340 is defined within the high vacuum chamber 320. A doped crystal 350 can be positioned on a support 360 within the chamber 320. A pump laser 370 can be used to excite the doped crystal 350 within the chamber 320 as further described in the following.

By way of further example, the laser 370 can include a CW thin-disk Yb:YAG laser (e.g. 40 W, 1030 nm) optically isolated from and mode-matched via lens pair (MML) to the resonant cavity 340 within the high vacuum chamber 320. The crystal 350 can be a Brewster-cut Yb:YLF crystal positioned inside the cavity 340, the cavity housing a partially-reflective (Ric) input-coupler (not shown) and a highly reflective back mirror (not shown). The crystal 350 can include parameters such as E//c, 5% doped and of length Lc=1.1 cm, and can have an optical impedance matching condition Ric=exp(−2α(λ,T)Lc) corresponding to total absorption on resonance beneficial for small absorption coefficients, e.g. energetically below the E4-E5 transition and/or at low temperatures. For a given cooling power, lower temperatures are achieved by minimizing the thermal load which is predominantly of black-body nature. This can be accomplished by placing the crystal 350 into the vacuum chamber 320 configured as a tightly-fit copper clamshell structure coated inside with the low thermal emissivity material 330 that is also highly absorbing at the fluorescence wavelengths. The crystal 350 can be mechanically supported by optical fibers protruding from the clamshell walls, thus minimizing adverse conductive heat load. A temperature of the crystal 350 can be monitored using non-contact differential luminescence thermometry (DLT) technique which deduces the temperature from corresponding variations of fluorescence spectrum.

The doped crystal 350 is configured to resonate at a Stark manifold resonance capable of cooling the crystal to a temperature of from about 110K to about 170K. In embodiments, the crystal can be cooled to a temperature of about 155 K.

The excitation laser can be tuned to exploit the Stark manifold resonance corresponding to the cooling of the crystal. The doped crystal can include a ytterbium dopant at a density of about 1% to about 40% of a YLF crystal. The doping can further be at a density of about 5%. The excitation laser can include a YAG laser, and more particularly a Yb:YAG laser.

Using active cavity stabilization of FIG. 3, cooling by 70 K from room temperature can be achieved at a wavelength of 1030 nm. The laser xx can be tuned to nearly overlap with the E4-E5 resonance and maximize absorption via 8-pass non-resonant cavity geometry. After a cooling cycle of about 30 minutes, the crystal can exhibit a temperature drop of nearly 145 K with respect to the vacuum chamber 320 being at 310 K. By cooling the chamber 320 back to ambient, the crystal 350 can reach cryogenic temperature of about 164 K, where the heating load is estimated to be 110 mW, down from nearly 300 mW of heat lift at room temperature.

In the configuration of FIG. 3, the thin-disk diode-pumped Yb:YAG excitation laser (35 W at 1,030 nm) can be tuned to a wavelength of 1,023 nm to excite the doped crystal xx close to the E4-E5 transition with a power of 9 W. At the absorbed power of 3.5 W at 1,023 nm, the crystal 350 can cool to 155±1 K absolute temperature. A heat lift of nearly 90 mW can be achieved based on the known resonant absorption values. This temperature is near the minimum attainable temperature of 140±1 K. The minimum temperature is constrained by population depletion of the ground-state manifold of ytterbium, leading to diminishing resonant absorption and cooling efficiency. The wavelength range of the excitation is limited by the pump laser, but a model can be used to predict cooling performance when pumping directly at the E4-E5 transition of 1,020 nm. With direct wavelength scaling, an NIST-defined cryogenic operation (<123 K) can be attained. An optical refrigerator utilizing the exemplary doped crystal resonated at an E4-E5 transition will (and already has) surpass multi-stage thermoelectric cooler (TEC) performance in both absolute temperature and useful heat lift. Optical refrigeration is the only known means of reaching cryogenic temperatures with an all solid-state system.

With measured values of nay, and $n_{abs}(v,T)$ and $n_{ext}$, cooling efficiency can be plotted as a function of both frequency and temperature. The E4-E5 transition produces maximum cooling efficiency, where a minimum temperature of 110 K is predicted for the doped crystal parameters. Even lower temperatures and higher cooling efficiencies can be expected upon enhancement of $n_{abs}$ by higher purity and/or ytterbium concentration. For a fixed doping density, an eightfold improvement in sample purity will result in achievable temperatures near nitrogen liquefaction. A cooling efficiency of 1.25% will be possible at 100 K, making the disclosed technology practical for many applications.

In summary, a new milestone has now been reached in the field of laser cooling of solids. By making use of the sharp Stark resonance of ytterbium ions doped into a crystalline solid, an absolute temperature of about 155±1 K accompanied by about 90 mW of heat lift can been achieved with a single-stage refrigerator. This surpasses the performance of currently available Peltier coolers. Analysis shows that a minimum temperature of about 110 K can be reached for existing Yb:YLF crystals when excited directly at the E4-E5 transition with sufficient laser power.

The crystal 350 disclosed herein can be incorporated into known glass walled cryocooling devices used for cooling electronics. Essentially, the known cryocooling devices can be modified by replacing the glass housing with the crystal structure, to achieve the lower cooling temperatures disclosed herein, and which have been previously unattainable by the known glass walled cryocooling devices. Accordingly, the present disclosure is intended to encompass cooling of electronic devices with the solid state cooling structure alone or incorporating the doped crystal configured to resonate at a Stark manifold resonance capable of cooling the crystal to a temperature of from about 110K to about 170K.

Figure 4:
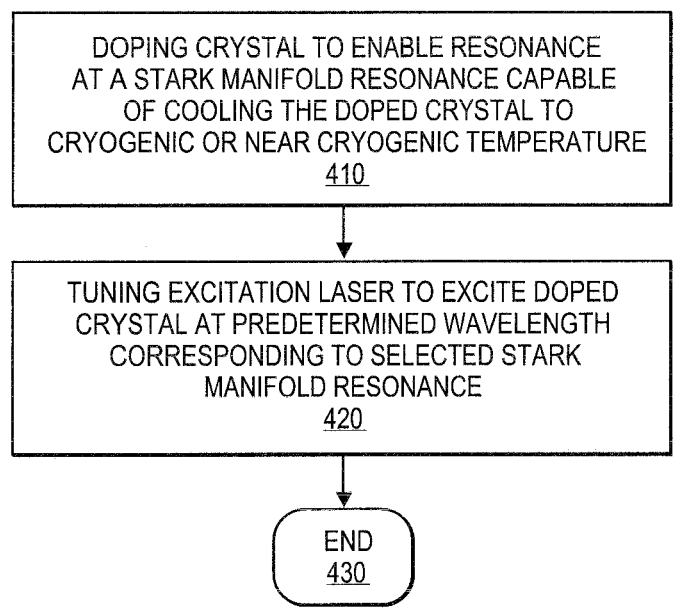
FIG. 4 is flow diagram depicting a method of increasing cooling efficiency of an optical refrigerator, according to exemplary embodiments herein.

FIG. 4 is directed to a method 400 for cooling electronics. It should be readily apparent to one of ordinary skill in the art that the method of FIG. 4 represent s a generalized schematic illustration and that other steps can be added or existing steps can be removed or modified.

In particular, FIG. 4 is directed to a method of exploiting Stark manifold resonances in crystals to increase the cooling efficiency of an optical refrigerator. The method can include doping a crystal at 410 to enable resonance at a Stark manifold resonance capable of cooling the doped crystal to a temperature of about 110K to about 170K. At 420, the method can include tuning an excitation laser to excite the doped crystal at a predetermined wavelength corresponding to a selected Stark manifold resonance. The method can conclude at 430.

In embodiments, the cooling can be to a temperature of about 155K.

Doping the crystal can include doping Yb ions into a YLF crystal. The doping can include doping to a density of about 1% to about 40% of the crystal. In embodiments, doping can be to a density of about 5% of the crystal. The excitation laser can include a Yb:YAG laser. The method can further include initially setting the excitation laser at 1030 nm with a power of 35 W and tuning to 1023 nm to excite close to the E4-E5 transition with a power of 9 W.

In the above embodiments, it will be appreciated that the applicable environment can include any industrial cooling and heating devices, for example, a heat exchanger, steam generator, waste heat recovery device, high temperature equipment, military and aerospace hardware, refrigeration, and similar devices that include liquids such as water and refrigerant.

It will be apparent to those skilled in the art that various modifications and variations can be made in the devices and methods of various embodiments of the invention. Other embodiments will be apparent to those skilled in the art from consideration of the specification and practice of the embodiments disclosed herein. It is intended that the specification and examples be considered as examples only. The various embodiments are not necessarily mutually exclusive, as some embodiments can be combined with one or more other embodiments to form new embodiments. The current configuration discussed is one embodiment. Other possible embodiments are envisioned and include, but are not limited to enhanced nucleate boiling and immersion cooling of electronic devices.

It is noted that, as used in this specification and the appended claims, the singular forms "a," "an," and "the," include plural referents unless expressly and unequivocally limited to one referent. Thus, for example, reference to "a wavelength" includes two or more different wavelengths. As used herein, the term "include" and its grammatical variants are intended to be non-limiting, such that recitation of items in a list is not to the exclusion of other like items that can be substituted or other items that can be added to the listed items.

What is claimed is:

1. A method of exploiting Stark manifold resonances in crystals to increase the cooling efficiency of an optical refrigerator, the method comprising:

doping a crystal to enable resonance at a Stark manifold resonance capable of cooling the doped crystal to a temperature of about 110K to about 155K; and laser cooling the doped crystal to a temperature of about 110K to about 155K by tuning an excitation laser to excite the doped crystal at a predetermined wavelength corresponding to a selected Stark manifold resonance at an E4-E5 Stark Manifold transition in the doped crystal;

wherein the excitation laser comprises a Yb:YAG laser.

2. The method of claim 1, wherein the laser cooling comprises laser cooling of the doped crystal to a temperature of about 155K.

3. The method of claim 1, wherein doping the crystal comprises doping Yb ions into a YLF crystal.

4. The method of claim 3, wherein doping comprises doping to a density of about 1% to about 40% of the crystal.

5. The method of claim 3, wherein doping comprises doping to a density of about 5% of the crystal.

6. The method of claim 1, further comprising cooling an electronics device with the method of claim 1.

7. The method of claim 1, wherein doping the crystal comprises doping Yb ions into a $LiYF_4$ (YLF) crystal to a doping density of about 1% to about 5% of the YLF crystal.

8. The method of claim 1, wherein the laser cooling further comprises initially setting the excitation laser at 1030 nm with a power of 35 W before the tuning.

9. The method of claim 8, wherein the tuning comprises tuning the laser to 1023 nm with a power of 9 W.

* * * * *